United States Patent
Rader et al.

(10) Patent No.: US 7,694,405 B2
(45) Date of Patent: *Apr. 13, 2010

(54) METHOD FOR COUPLING A CONDUIT TO A FITTING

(75) Inventors: David Bruce Rader, Urbana, OH (US); Jerry Gordon Glatt, Lebanon, OH (US); Dennis Malone, Indian Springs, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/944,101

(22) Filed: Nov. 21, 2007

(65) Prior Publication Data

US 2008/0067812 A1 Mar. 20, 2008

Related U.S. Application Data

(62) Division of application No. 10/322,995, filed on Dec. 18, 2002, now Pat. No. 7,316,426.

(51) Int. Cl.
*B21D 39/00* (2006.01)
*F16L 13/14* (2006.01)

(52) U.S. Cl. .......................... 29/516; 285/382

(58) Field of Classification Search .......... 29/516, 29/508, 510, 515; 285/382, 239, 242, 257, 285/256, 148.13, 148.16, 148.17
See application file for complete search history.

(56) References Cited

U.S. PATENT DOCUMENTS

| | | | |
|---|---|---|---|
| 1,825,005 A | 9/1931 | Loughead | |
| 2,310,536 A | 2/1943 | Melsom | |
| 2,314,000 A | 3/1943 | Lusher et al. | |
| 2,314,001 A | 3/1943 | Lusher et al. | |
| 2,452,643 A | 11/1948 | Fields | |
| 2,453,997 A | 11/1948 | MacWilliam | |
| 2,865,094 A | 12/1958 | Press | |
| 2,978,263 A | 4/1961 | Walsh et al. | |
| 3,047,043 A | 7/1962 | Albrecht | |
| 3,287,034 A | 11/1966 | Bragg | |
| 3,325,194 A | 6/1967 | Grawey | |
| 3,750,452 A | 8/1973 | Frank | |
| 4,227,639 A | 10/1980 | Blumenberg | |
| 4,607,867 A | 8/1986 | Jansen | |
| 4,804,212 A | 2/1989 | Vyse | |
| 4,854,525 A | 8/1989 | Chee | |
| 5,064,144 A | 11/1991 | Chee | |
| 5,074,600 A | 12/1991 | Weinhold | |
| 5,199,751 A | 4/1993 | Beagle et al. | |
| 5,222,360 A | 6/1993 | Antuna et al. | |
| 5,381,773 A | 1/1995 | Straub | |
| 5,396,761 A | 3/1995 | Woltmann et al. | |
| 5,467,758 A | 11/1995 | Moriyama et al. | |
| 5,961,157 A | 10/1999 | Baron et al. | |

(Continued)

*Primary Examiner*—John C Hong
(74) *Attorney, Agent, or Firm*—William Scott Andes, Esq.; Armstrong Teasdale LLP

(57) ABSTRACT

A method for coupling a conduit to a fitting. The method includes providing a fitting having a body and a passageway extending through the fitting body, inserting at least a portion of the fitting body within at least a portion of a collar, and compressing at least a portion of the collar around at least a portion of the fitting body such that the fitting body is not internally supported from within the passageway.

10 Claims, 4 Drawing Sheets

U.S. PATENT DOCUMENTS 6,232,703 B1   5/2001   Huffman
6,311,733 B1   11/2001  Azzolini et al.
6,802,540 B2 * 10/2004  Malone et al. .............. 285/256

* cited by examiner

METHOD FOR COUPLING A CONDUIT TO A FITTING

CROSS-REFERENCE TO RELATED APPLICATIONS

This application is a divisional of U.S. patent application Ser. No. 10/322,995, filed Dec. 18, 2002, now U.S. Pat. No. 7,316,426 which is hereby incorporated by reference and is assigned to assignee of the present invention.

BACKGROUND OF THE INVENTION

This invention relates generally to fittings, and more specifically to methods and apparatus for coupling a conduit to a fitting.

At least some known conduit fitting assemblies include a collar coupled to an end fitting. The end of the conduit end is received within a portion of the collar, and a portion of the end fitting is received within the conduit end. More specifically, the portion of the collar that includes the conduit end is then compressed radially inwardly such that the conduit end is compressed between the end fitting and the collar. When compressed, friction created between the collar and an outer surface of the conduit end, and friction created between an inner surface of the conduit end and the end fitting retains the conduit end within the collar.

At least some known collars are threadably coupled to the conduit end fitting, while other known collars include an offset that mates with a reduced diameter portion of the end fitting when compressed to secure the collar to the end fitting. However, such conduit fitting assemblies may require an extended length to ensure a secure connection is created between the collar and the conduit end fitting. Accordingly, the cost and overall weight of the conduit fitting assembly may be increased. Furthermore, known end fitting assemblies may not include a generally uniform end fitting nipple portion outer diameter, which may increase difficulty of inserting the fitting nipple portion within the conduit end.

Other known conduit end fitting assemblies include a mandrel that is inserted within a passageway defined in the end fitting to support the end fitting and to prevent partial, or complete, collapse of the passageway. Typically, a mandrel is a rigid metallic tool that is received within the end fitting. However, for complex conduit geometries, a mandrel may be an eutectic compound that is inserted within the end fitting. Mandrels may increase the labor and tooling required to produce such fitting assemblies. In addition, when the mandrel is a eutectic compound, the eutectic compound may contaminate fluid flowing through the fitting assembly.

BRIEF DESCRIPTION OF THE INVENTION

A method is provided for coupling a conduit to a fitting. The method includes providing a fitting having a body and a passageway extending through the fitting body, inserting at least a portion of the fitting body within at least a portion of a collar, and compressing at least a portion of the collar around at least a portion of the fitting body such that the fitting body is not internally supported from within the passageway.

A fitting is provided for a fitting assembly. The fitting includes a body extending between a first end and a second end. The fitting body is configured to be at least partially received within a collar. The collar is configured to be compressed around the portion of the fitting body received within the collar such that the collar is fixedly secured to the fitting. The fitting also includes a passageway extending through the body. The passageway is configured to substantially resist radial deformation when the collar is compressed radially around the fitting body such that the fitting body is not internally supported from within the passageway.

A fitting assembly is provided including a conduit having a body extending between a first end and a second end, and a fitting including a body extending between a first end and a second end. The fitting body includes a passageway extending through the fitting body. The fitting first end includes a nipple portion. In addition, the fitting assembly includes a collar having a body extending between a first end and a second end. The fitting body nipple portion is at least partially received within the conduit first end. The conduit first end is at least partially received within the collar body. The collar body is compressed around the conduit first end and a portion of the fitting body such that the conduit first end is compressed between the collar body and at least a portion of the fitting body nipple portion. The passageway is configured to substantially resist radial deformation during compression of the collar body and the first conduit end such that the fitting body is not internally supported within the passageway.

DETAILED DESCRIPTION OF THE INVENTION

As used herein, the term "conduit" may include any apparatus through which a fluid may be conveyed. For example, a conduit may include a tube, a pipe, a duct, a flexible hose, and/or a non-flexible hose. The above examples are intended as exemplary only, and thus are not intended to limit in any way the definition and/or meaning of the term "conduit".

Figure 1:
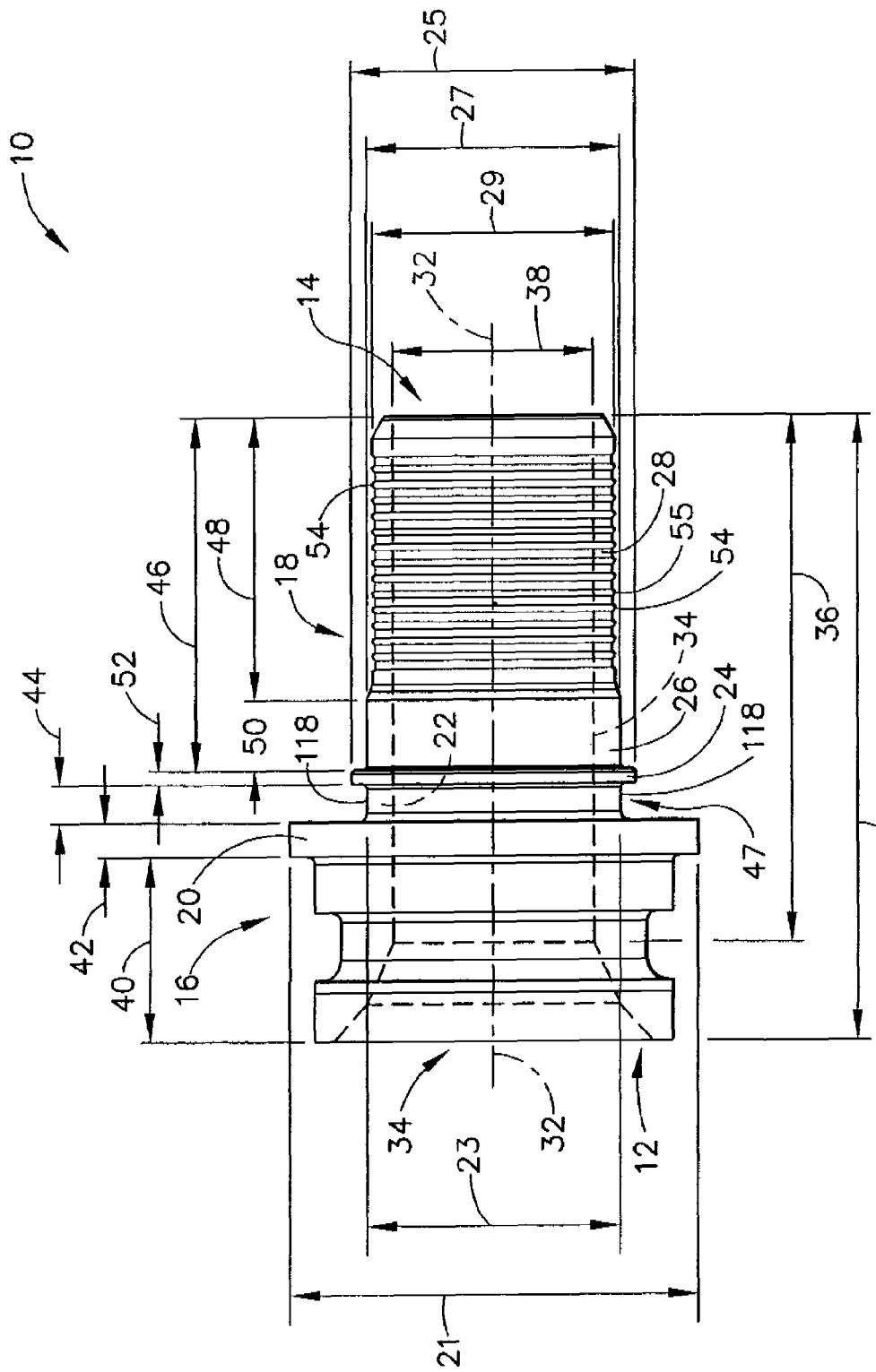
FIG. 1 is a side view of an exemplary end fitting for use with a conduit fitting assembly.

FIG. 1 is a side view of an exemplary end fitting 10 for use with a conduit fitting assembly (not shown in FIG. 1). End fitting 10 includes a first end 12, a second end 14, a fitting portion 16, and a nipple portion 18. End fitting 10 also includes a first annular portion 20 having a first diameter 21, a second annular portion 22 having second diameter 23, a third annular portion 24 having a third diameter 25, a fourth annular portion 26 having a fourth diameter 27, and a fifth annular portion 28 having a fifth diameter 29. In one embodiment, fourth diameter 27 is substantially equal to second diameter 23.

End fitting 10 has an overall length 30 measured between first end 12 and second end 14. A central axis 32 extends through end fitting 10 from first end 12 to second end 14. A substantially cylindrical passageway 34 extends through end fitting 10 from second end 14 to fitting portion 16 for a length 36. In the exemplary embodiment, passageway 34 has a substantially constant diameter 38 that is smaller than first diameter 21, second diameter 23, third diameter 25, fourth diameter 27, and fifth diameter 29. Fitting portion 16 is a distance 40 from end fitting first end 12, and is configured to couple with a second end fitting (not shown) such that passageway 34 is in coupled fluid communication with a passageway (not shown) extending through the second fitting.

End fitting first annular portion 20 has a width 42 extending between end fitting second annular portion 22 and fitting portion 16. End fitting second annular portion 22 has a width 44 extending between first annular portion 20 and end fitting third annular portion 24. A groove 47, hereinafter referred to as flange groove 47, is defined between end fitting second annular portion 22 and third annular portion 24. Nipple portion 18 is adjacent end fitting second end 14 and extends a distance 46 from end fitting second end 14 to end fitting third annular portion 24. Accordingly, nipple portion 18 includes fourth annular portion 26 and fifth annular portion 28. Fifth annular portion 28 extends a distance 48 from end fitting second end 14 to fourth annular portion 26, and fourth annular portion 26 extends a width 50 between fifth annular portion 28 and third annular portion 24. End fitting third annular portion 24 has a width 52 extending between end fitting second annular portion 22 and fourth annular portion 26. Nipple fifth annular portion 28 includes a plurality of projections 54 that extend outwardly therefrom and define nipple fifth diameter 29. As will be discussed in greater detail below, projections 54 facilitate retaining end fitting nipple portion 18 within a conduit end (not shown in FIG. 1).

Figure 2:
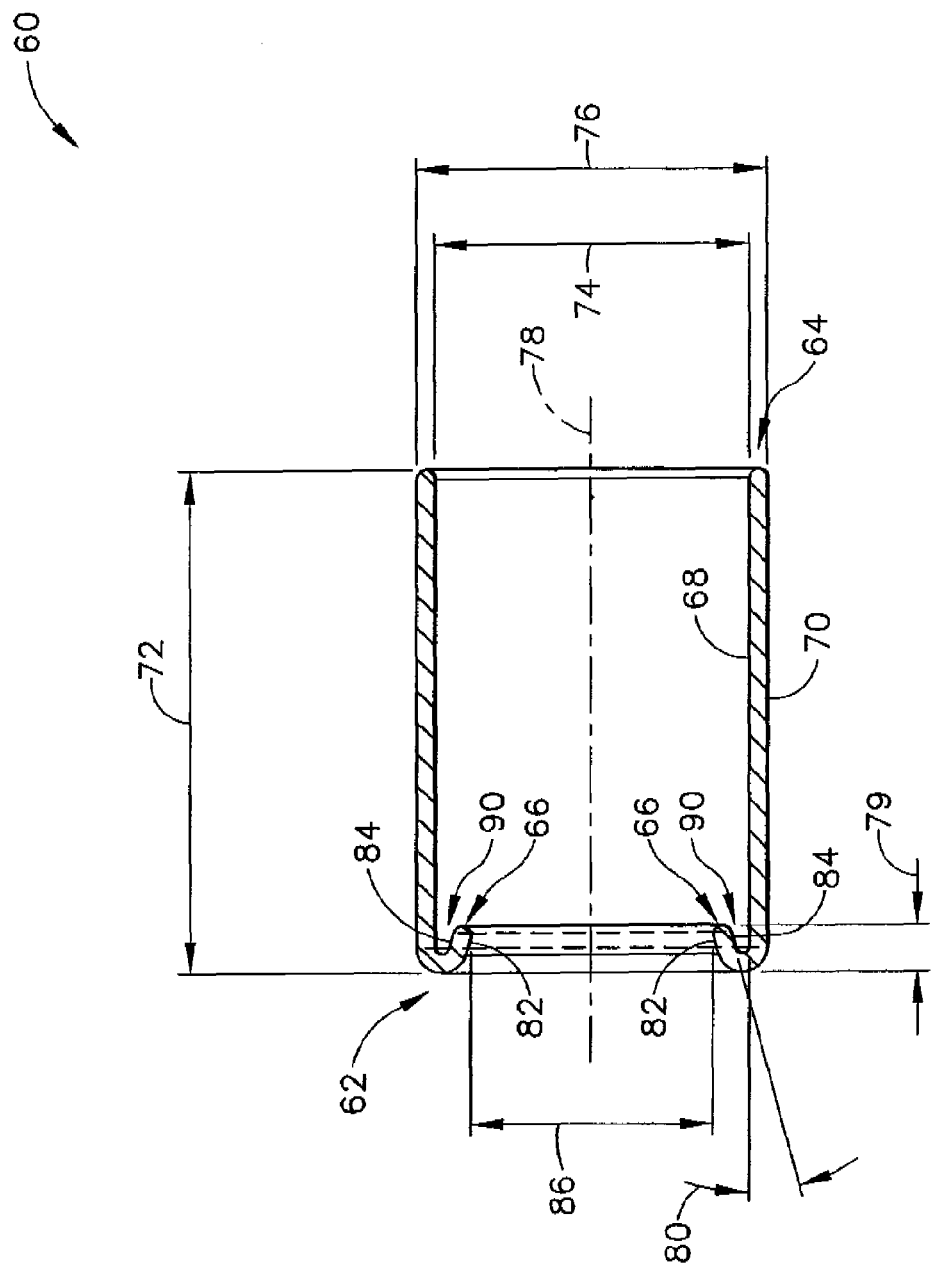
FIG. 2 is a cross-sectional view of an exemplary collar for use with a conduit fitting assembly.

FIG. 2 is a cross-sectional view of an exemplary collar 60 for use with a conduit fitting assembly (not shown in FIG. 2). Collar 60 includes a first end 62, a second end 64, a flange 66, a radially inner surface 68, and a radially outer surface 70. Collar 60 extends a length 72 between collar ends 62 and 64. In the exemplary embodiment, collar 60 is substantially cylindrical. An inner diameter 74 of collar 50 is defined by collar radially inner surface 68, and an outer diameter 76 of collar 60 is defined by collar radially outer surface 70. Collar 60 also includes a central axis 78 that extends through collar length 72. Flange 66 extends generally radially inwardly from collar first end 62 for a length 79, towards collar second end 64. In the exemplary embodiment, flange length 79 is smaller than end fitting second annular portion width 44, such that flange 79 can be received within flange groove 47. Accordingly, flange 66 extends outwardly from collar first end 62 at an angle 80 relative to collar radially inner surface 68 such that flange 66 is obliquely aligned with respect to collar radially inner surface 68. In one embodiment, angle 80 is approximately equal to 9.5° relative to radially inner surface 68. In another embodiment, angle 80 may be between approximately 9° and 10° relative to radially inner surface 68.

Flange 66 includes a radially inner surface 82 and a radially outer surface 84. Flange radially inner surface 82 defines an inner diameter 86 of flange 66 that is larger than end fitting second diameter 23. In addition, flange 66 includes a flange gap 90 that is defined by flange radially outer surface 84 and collar radially inner surface 68, and more specifically, by flange angle 80.

Figure 3:
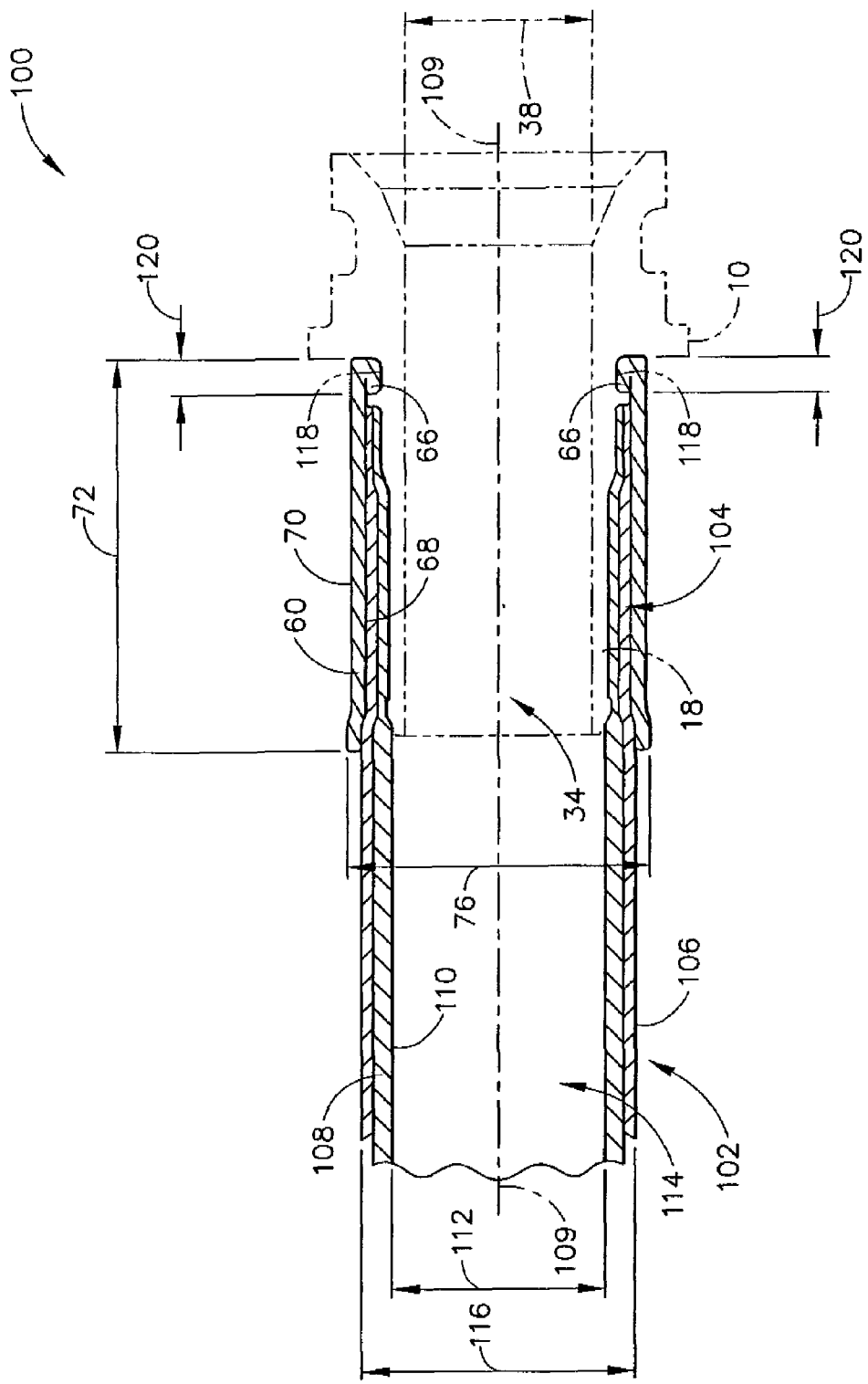
FIG. 3 is a cross-sectional view of a conduit fitting assembly including the end fitting shown in FIG. 1, and the collar shown in FIG. 2.

FIG. 3 is a cross-sectional view of a conduit fitting assembly 100 including end fitting 10, collar 60, and a conduit 102. Conduit 102 includes a first end 104, a second end (not shown), a radially outer surface 106, and a liner 108. A central axis 109 extends through conduit 102 between conduit first end 104 and the conduit second end. A radially inner surface 110 of conduit liner 108 defines an inner diameter 112 of conduit 102. Conduit liner inner surface 110 also defines a passageway 114 that extends substantially through the length of conduit 102 between conduit first end 104 and the conduit second end. Conduit radially outer surface 106 defines an outer diameter 116 of conduit 102. Conduit 102 is received within a portion of collar 60, and end fitting nipple portion 18 is received within a portion of conduit 102, such that conduit passageway 114 is coupled in fluid communication with end fitting passageway 34. In the exemplary embodiment, conduit inner diameter 112 is smaller than nipple fourth diameter 27 and nipple fifth diameter 29. In addition, in the exemplary embodiment, conduit outer diameter 116 is smaller than collar inner diameter 74.

To assemble conduit fitting assembly 100, conduit first end 104 is inserted within a portion of collar 60 such that conduit 102 and collar 60 are substantially concentrically aligned, and such that conduit central axis 109 is substantially co-linearly aligned with collar central axis 78. End fitting nipple portion 18 is then inserted within conduit first end 104 such that flange 66 is at least partially received in flange groove 47, and such that end fitting 10 is generally concentrically aligned with conduit 102 and collar 60. More specifically, end fitting central axis 32 is substantially co-linearly aligned with collar central axis 78 and conduit central axis 109. Compressive force is then applied around at least a portion of collar radially outer surface 70 such that conduit 102 is compressed radially inwardly between end fitting nipple portion 18 and collar 60. More specifically, a portion of conduit 102 is compressed radially inwardly between nipple fifth annular portion 28 and collar radially inner surface 68, and a portion of conduit 102 is compressed between collar radially inner surface 68 and nipple fourth annular portion 26.

Compression of collar 60 also forces flange 66 within flange groove 47, such that flange radially inner surface 82 contacts an outer surface 118 of end fitting second diameter portion 22, and such that flange 66 is compressed. Compression of flange 66 causes flange gap 90 to substantially close such that flange radially outer surface 84 contacts collar radially inner surface 68. Accordingly, when compressed, flange 66 is substantially parallel with collar radially inner surface 68. In addition, when flange 66 is compressed flange 66 extends a length 120 from collar first end 62 towards collar second end 64. In the exemplary embodiment, flange length 120 is approximately equal to end fitting second annular portion width 44, such that flange 66 fits securely within flange groove 47 when compressed.

Once collar 60 has been compressed, friction between collar radially inner surface 68 and conduit radially outer surface 106 facilitates retaining conduit first end 104 within collar 60 such that first end 104 is fixedly secured to collar 60. In one embodiment, conduit radially outer surface 106 includes a wirebraid (not shown) that facilitates retaining conduit first end 104 within collar 60 such that first end 104 is fixedly secured to collar 60. In addition, friction between projections 54 and conduit liner inner surface 110 facilitates retaining end fitting nipple portion 18 within conduit first end 104 such that end fitting nipple portion 18 is fixedly secured within conduit first end 104. Furthermore, when collar 60 has been compressed, flange 66 facilitates retaining a portion of end fitting 10 within collar 60 such that end fitting 10 is fixedly secured to collar 60. Once conduit fitting assembly has been assembled, conduit passageway 114 is coupled in fluid communication with end fitting passageway 34 and is substantially sealed with respect to end fitting passageway 34, such that fluid does not leak from conduit fitting assembly 100. More specifically, compression of conduit 102 between fourth annular portion 26 and collar radially inner surface 68 facilitates sealing conduit fitting assembly 100 to facilitate preventing fluid flow and/or leakage between conduit liner inner surface 110 and the radially outer surfaces of fitting nipple portion 18.

Figure 4:
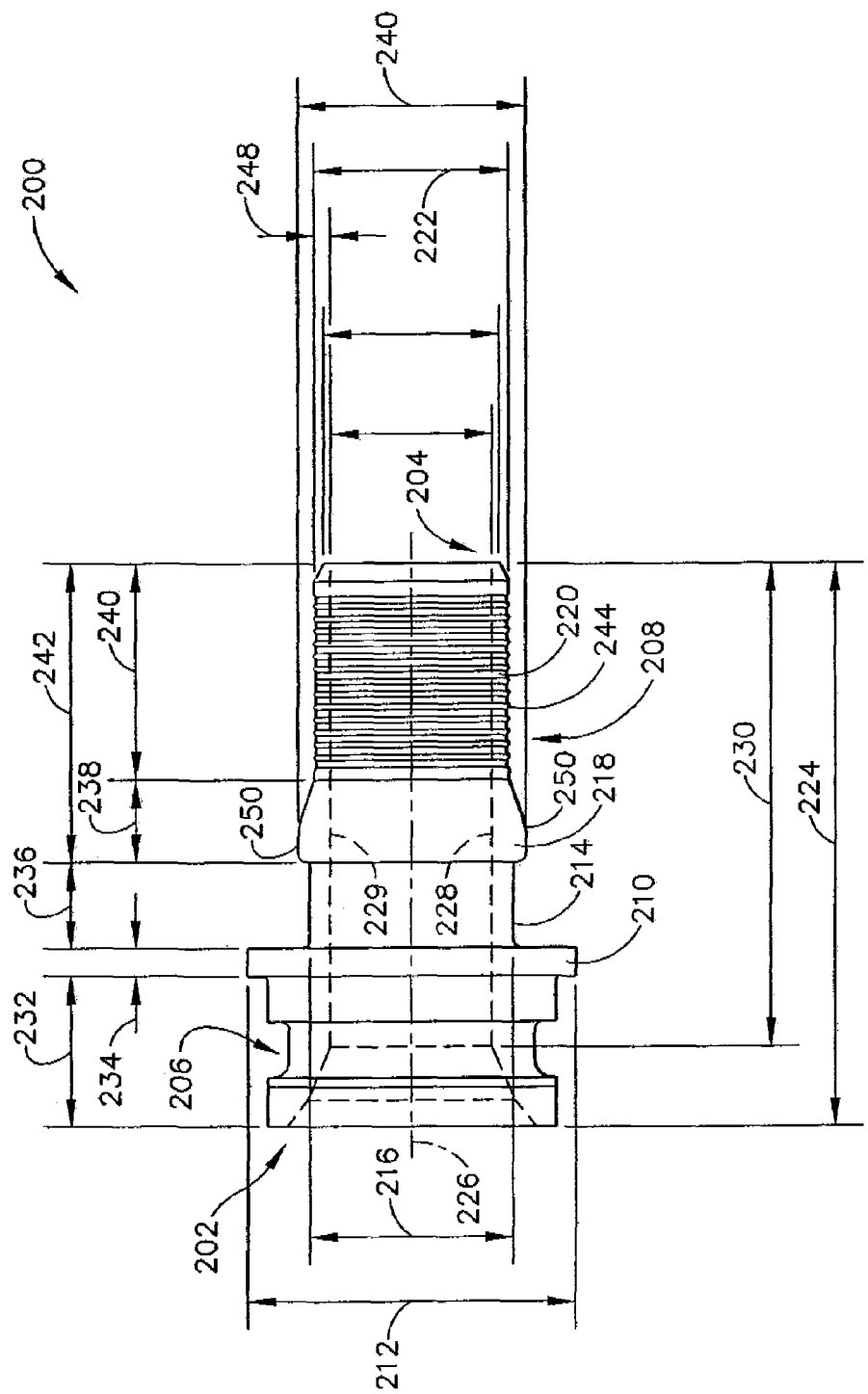
FIG. 4 is a side view of an alternative embodiment of an end fitting that may be used with the fitting assembly shown in FIG. 3.

FIG. 4 is side view of an alternative embodiment of an end fitting 200 that may be used with a conduit fitting assembly, such as conduit fitting assembly 100 (shown in FIG. 3). End fitting 200 includes a first end 202, a second end 204, a fitting portion 206, and a nipple portion 208. End fitting 10 also includes a first annular portion 210 having a first diameter 212, a second annular portion 214 having second diameter 216, a third annular portion 218, and a fourth annular portion 220 having a fourth diameter 222.

End fitting 200 has an overall length 224 measured between first end 202 and second end 204. A central axis 226 extends through end fitting 200 from first end 202 to second end 204. A substantially cylindrical passageway 228 extends through end fitting 200 from second end 204 to fitting portion 206 for a length 230. Fitting portion 206 is a distance 232 from end fitting first end 202, and is configured to couple with a second end fitting (not shown) such that passageway 228 is in coupled fluid communication with a passageway (not shown) extending through the second fitting.

First annular portion 210 has a width 234 extending between end fitting second annular portion 214 and fitting portion 206. End fitting second annular portion 214 has a width 236 extending between first annular portion 210 and end fitting third annular portion 218. End fitting third annular portion 218 has a width 238 extending between second annular portion 214 and end fitting fourth annular portion 220. End fitting third annular portion 218 has a third diameter 240 adjacent second annular portion 214 that decreases along third annular portion width 238 as third annular portion 218 approaches fourth annular portion 220. The diameter of third annular portion 218 is substantially equal to fourth diameter 222 at the intersection of third annular portion 218 and fourth annular portion 220. End fitting fourth annular portion 220 extends a distance 240 from third annular portion 218 to end fitting second end 204.

End fitting nipple portion 208 is adjacent end fitting second end 204 and extends a distance 242 from end fitting second end 204 to end fitting third annular portion 218. Accordingly, nipple portion 208 includes fourth annular portion 220. End fitting nipple portion 208 is configured to be received within a conduit end, as described above in reference to end fitting 10 (shown in FIG. 1) and conduit fitting assembly 100 (shown in FIG. 3). Nipple fourth annular portion 220 includes a plurality of projections 244 that extend outwardly therefrom and define nipple fourth diameter 222. Projections 244 facilitate retaining end fitting nipple portion 208 within the conduit end.

Compressive force is applied radially inwardly to a collar (not shown) to secure end fitting 200 to the collar. Unlike collar 60 (shown in FIG. 2) the collar is a substantially right cylinder, and is known as a straight collar. The compressive force may cause deformation to at least some known end fittings such that a fluid passageway, such as passageway 228, within the end fitting may partially collapse, thereby possibly restricting fluid flow through the passageway. End fitting 200 includes a minimum thickness 248 between end fitting radially inner wall 229 and second diameter 216, between end fitting radially inner wall 229 and an outer surface 250 of third annular portion 218, and between end fitting radially inner wall 229 and fourth diameter 222. More specifically, a thickness of at least minimum thickness 248 extends along second annular portion fifth length 236, third annular portion sixth length 238, and fourth annular portion seventh length 240. When compressive force is applied radially inwardly along second annular portion fifth length 236, third annular portion sixth length 238, and fourth annular portion seventh length 240, minimum thickness 248 provides sufficient strength to support passageway 228 such that passageway 228 substantially resists radial deformation beyond design requirements, and such that end fitting 200 is not supported from within passageway 228. In addition, in one embodiment minimum thickness 248 facilitates preventing radial deformation of passageway 228 greater than 0.002 inches. In another embodiment, thickness 248 facilitates preventing radial deformation of passageway 228 greater than 0.0005 inches. In yet another embodiment, minimum thickness 248 facilitates preventing radial deformation of passageway 228 greater than 0.001 inches.

The above-described conduit fitting assembly is cost-effective and highly reliable for coupling a conduit to a fitting. The assembly permits a lightweight and low-cost collar to be precision mated to an end fitting without the use of a threaded connection. More specifically, the assembly allows the use of an end fitting that is shorter, thereby decreasing the assemblies weight and cost, and increasing the amount of conduit that is flexible. The assembly may also facilitate coupling a conduit to a fitting without using a mandrel. As a result, the assembly facilitates coupling a conduit to a fitting in a cost-effective and reliable manner.

Exemplary embodiments of conduit fitting assemblies are described above in detail. The assemblies are not limited to the specific embodiments described herein, but rather, components of each assembly may be utilized independently and separately from other components described herein. Each fitting assembly component can also be used in combination with other fitting assembly components.

While the invention has been described in terms of various specific embodiments, those skilled in the art will recognize that the invention can be practiced with modification within the spirit and scope of the claims.

What is claimed is:

1. A method for coupling a conduit to a fitting, said method comprising:
   providing a fitting having a body and a passageway extending through the fitting body;
   inserting at least a portion of the fitting body within at least a portion of a collar, wherein the collar includes a body including an inner surface, an outer surface, and a flange extending between the body and the fitting body; and
   compressing at least a portion of the collar around at least a portion of the fitting body wherein at least a portion of the flange is compressed against the inner surface of the collar and such that the fitting body is not internally supported from within the passageway.

2. A method in accordance with claim 1 wherein inserting at least a portion of the fitting body within at least a portion of a collar comprises:
   inserting a portion of a conduit within at least a portion of the collar; and
   inserting at least a portion of the fitting within the portion of the conduit received within the collar.

3. A method in accordance with claim 1 wherein the collar is substantially cylindrical, compressing at least a portion of the collar around at least a portion of the fitting body comprises compressing the collar radially inwardly around at least a portion of the fitting body.

4. A method in accordance with claim 1 wherein compressing at least a portion of the collar around at least a portion of the fitting body comprises compressing a portion of a conduit between the collar and the fitting such that the conduit is fixedly secured to the collar and the fitting.

5. A method in accordance with claim 1 wherein providing a fitting having a body and a passageway extending through the fitting body comprises providing a fitting body including a passageway defined therein that substantially resists radial deformation when the collar is compressed radially inwardly around the fitting body.

6. A method in accordance with claim 5 wherein providing a fitting body including a passageway defined therein further comprises providing a fitting body including a sidewall defining the passageway that has a minimum thickness that is substantially constant throughout a length of the body.

7. A method in accordance with claim 1 wherein compressing at least a portion of the collar around at least a portion of the fitting body comprises compressing at least a portion of the collar around at least a portion of the fitting body without inserting a mandrel into the passageway.

8. A method in accordance with claim 1 wherein compressing at least a portion of the collar around at least a portion of the fitting body comprises compressing at least a portion of the collar around at least a portion of the fitting body without radially deforming the dimensions of the passageway greater than 0.002 inches.

9. A method in accordance with claim 1 wherein compressing at least a portion of the collar around at least a portion of the fitting body comprises compressing at least a portion of the collar around at least a portion of the fitting body without radially deforming the dimensions of the passageway greater than 0.001 inches.

10. A method in accordance with claim 1 wherein compressing at least a portion of the collar around at least a portion of the fitting body comprises compressing at least a portion of the collar around at least a portion of the fitting body without radially deforming the dimensions of the passageway greater than 0.0005 inches.

\* \* \* \* \*